Patented June 5, 1951

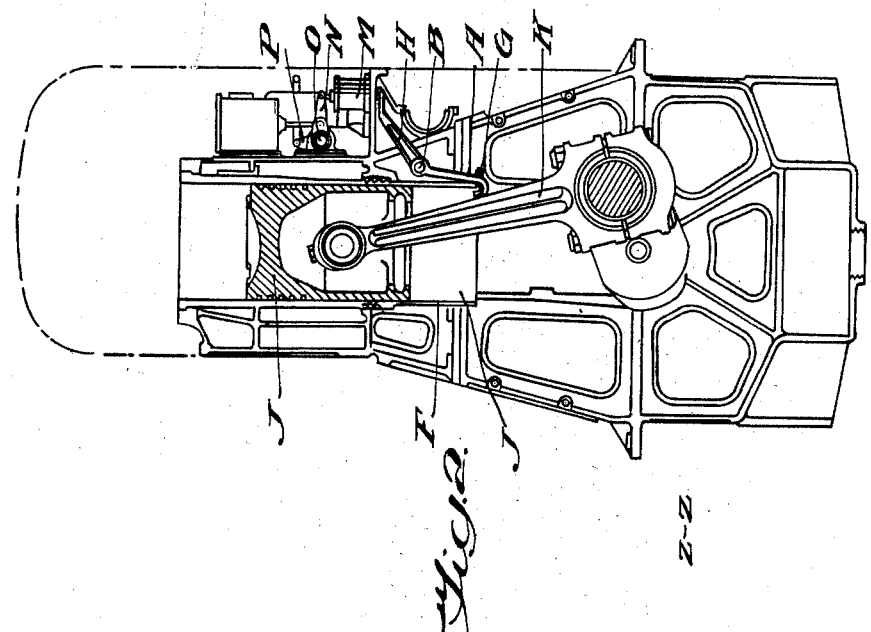
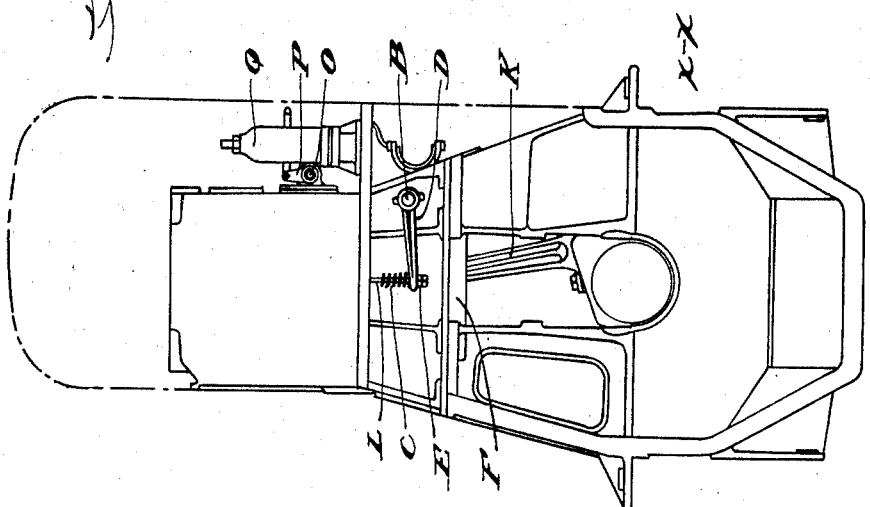

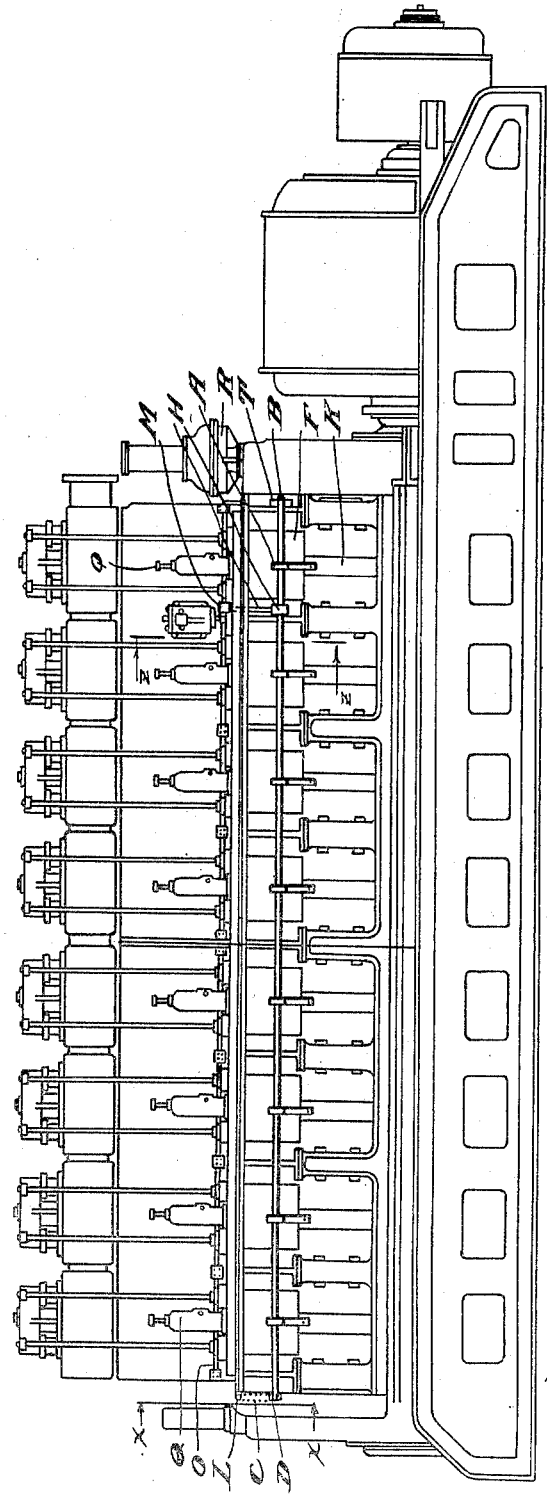

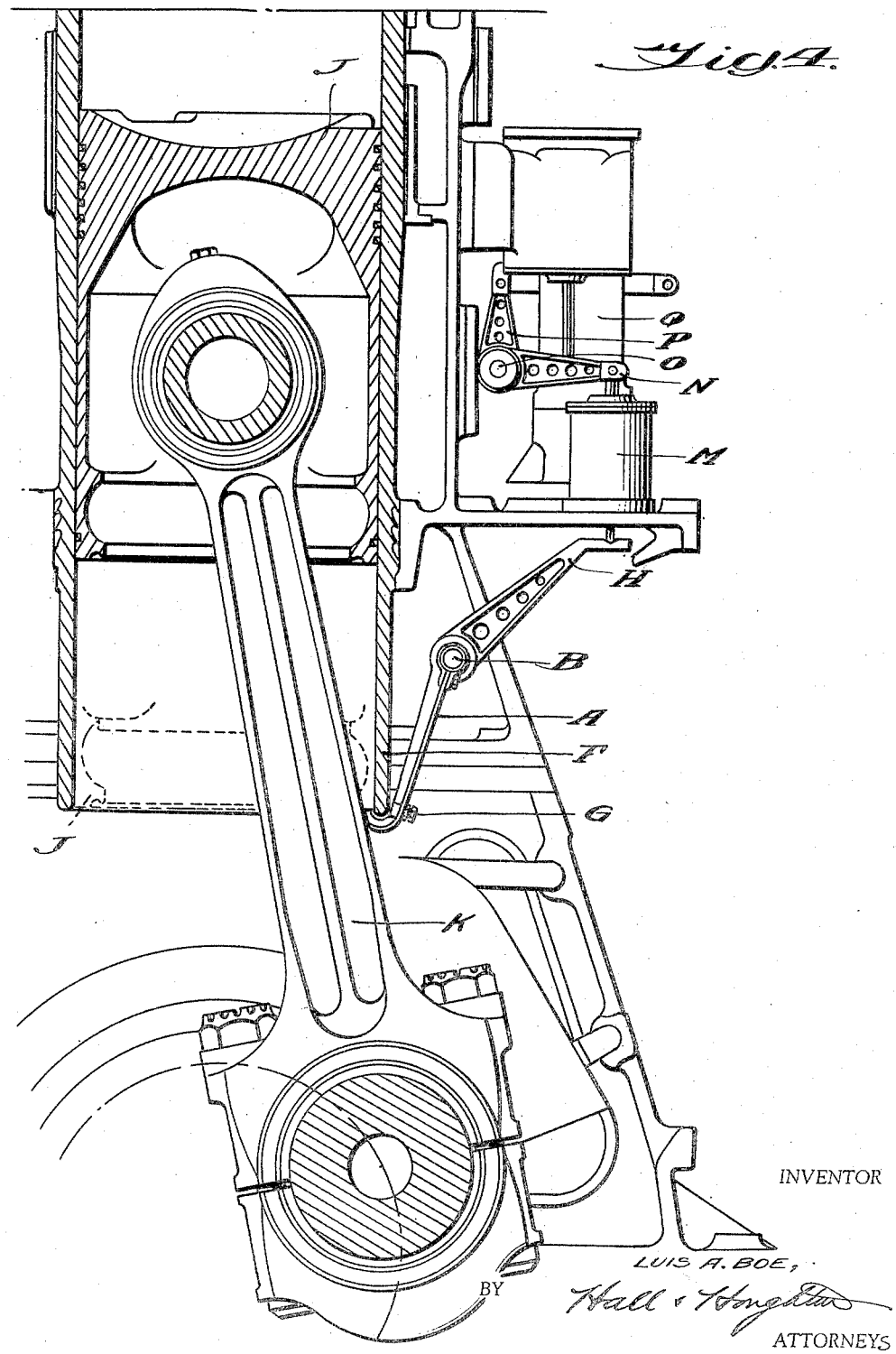

2,555,568

UNITED STATES PATENT OFFICE 2,555,568

SAFETY DEVICE FOR INTERNAL-COMBUSTION AND MORE ESPECIALLY DIESEL ENGINES

Luis Alfredo Boe, Banfield, Argentina

Application October 24, 1946, Serial No. 705,298

7 Claims. (Cl. 121—47)

The present invention refers to a safety device to stop the running of any type of internal combustion engine in the event of the breakage or torsion of a piston rod, dangerous wear or breakage of piston rod bearings or breakage of a piston head, for the purpose of avoiding the further damage which results when the engine, especially a Diesel engine, continues to run after such a breakage, excessive wear, torsion or other fault has produced a break down or stoppage.

The object of the invention is to provide a simple safety device which will stop the engine automatically when any of the faults mentioned arise. A further object of the invention is to provide the means to detect the fault and the means to cut off the supply of fuel or the ignition when the fault has been detected.

In accordance with the invention, a bar is provided parallel to the crankshaft, running longitudinally in relation to the engine and alongside the cylinders or piston casings. Cam levers are provided on this bar, one for each connecting rod, a surface or point of the cam being positioned so that it will be just free of contact with the side of the connecting rod at its maximum lateral inclination and at the same time the said surface or point of the cam is positioned so that it is just free of contact with the lower part of the piston head at the end of its downward stroke.

To one end of the longitudinal bar a lever is fixed which is provided with a spring attached to a fixed part of the engine in order to maintain the cams with a constant pressure in a determined position.

When a piston rod swings out of its normal orbit or when the piston head drops due to wear or other fault, contact is made with a cam which imparts a slight rotation to the longitudinal bar, at a convenient point on which a cam lever is provided adapted to operate a switch mechanism which in turn operates a device to cut off the ignition or the fuel supply.

The invention will be described by way of example with reference to the accompanying drawings, in which:

Figure 1 is a cross section of the end of a motor on the line X—X of Figure 3 showing the means for applying tension to the cam lever bar.

Figure 2 is a cross section of a motor on the line Z—Z of Figure 3 showing the position of the cams and levers which transmit the movement to the device for stopping the motor.

Figure 3 is a side elevation of a Diesel motor showing the security device in accordance with the invention.

Figure 4 is a larger scale view of the device as shown in Figure 2.

The device as illustrated and as hereinafter described shows an example of the invention as adapted to a Diesel engine for railroads.

With reference to the drawings, cam levers A, one for each cylinder, are mounted on a longitudinal bar B which runs parallel to the crankshaft. These cams are firmly fixed against the lower end of the cylinder F by means of the tension exerted by a spring C fixed at one end to an arm D provided on the bar B, the other end of the spring being attached to the body L of the motor and the tension of the spring being adjustable by means of a nut E.

The cam levers A are provided with an adjustable abutment or portion which allows them to be positioned as closely as possible to the lower end of the piston head J at the bottom of its stroke, which position of the piston head is shown in fine and dotted lines in Figures 2 and 4. A surface of the cam levers A is also positioned as closely as possible to the side of the piston rod K at its position of maximum lateral displacement and an adjustment can be made by the screws G in order to leave a very fine clearance. In the form shown (see especially Fig. 4) the lever A has at its tip in opposition to the lowest normal position of the piston skirt J a substantially horizontal upper surface or abutment, and also has in opposition to the side of the piston rod a nearly vertical surface or abutment. As the screw G is operated, the level A swings about center B and the respective distances of these two surfaces from the nearest normal positions of the skirt J and rod K are simultaneously increased or decreased. The horizontal upper surface or abutment at the tip of lever A may be adjusted in the initial machining of the part, or by filing, for example, to just clear the skirt when the nearly vertical tip surface just clears the piston rod. Thereafter the two clearances may be simultaneously increased or decreased to the desired extent by use of the screw G with or without further filing of the skirt-opposed abutment surface.

Owing to the tension provided by the spring C on the bar B, the adjustment screw G presses against the end of the cylinder and maintains the cams just out of contact with the piston head and piston rods under normal running conditions.

At a convenient point on the bar B the lever

H is mounted and connected by a switch M to the lever N which is mounted on the rod O and which by means of another lever P cuts off the supply of fuel from the fuel pumps Q to the cylinders, or the ignition in another arrangement, thus stopping the engine.

It will be evident that various failures may cause the piston skirt to drop below the lower limit of its normal stroke. Breakage of the piston head from the skirt will do so. Torsion of the piston rod may shorten it. Breakage of the piston rod or its bearing bolts may remove support from the piston. Seizing or burning out of the bearings will increase the piston stroke. Excessive bearing wear will also do this. The excessive descent of the piston skirt from any such cause, moves cam A sufficiently to rotate the bar B, moving the lever H which operates the switch M, thereby raising the cam N and rotating the rod O and advancing the levers P in order to cut off the fuel from the pumps Q (or cut the ignition) and stop the running of the motor. The switch M may be a mechanical or electrical interrupting device of any suitable kind.

Having thus described my invention and the manner in which it is to be performed, by way of example, I declare that what I claim is:

1. A safety device for engines of the type having a cylinder, a piston associated therewith, a crank, and a piston rod interconnecting said crank and piston, said device comprising at least one cam lever having a portion positioned to lie just out of contact with the side of the piston rod when the latter is at its point of closest normal approach thereto, said cam lever also having a portion positioned just out of contact with the piston in the lowest normal position thereof, means for supporting said lever in said position, said lever being movable by abnormal travel of said connecting rod or piston resulting from bearing wear or other failure, and a safety element responsive to movement of said lever.

2. A safety device according to claim 1 applicable to engines in which the piston has a skirt and the cylinder has a skirt that extends below the lowest normal position of the piston skirt, particularly characterized in that the cam lever rests against the lower end of the cylinder skirt and is maintained in position thereagainst by spring tension.

3. A safety device according to claim 2 in which the position of the cam lever is adjusted by an adjusting screw bearing against the lower portion of the cylinder skirt.

4. A safety device for engines of the type having a piston rod and a crank and piston interconnected thereby, said device comprising at least one cam lever having a portion positioned to be just out of contact with the side of the piston rod intermediate said crank and piston when the latter is at its point of closest normal approach thereto, means for supporting said lever in said position, said lever being movable by abnormal sideways displacement of the intermediate portion of said piston rod resulting from bearing wear or other failure, and a safety element responsive to movement of said lever.

5. A safety device for multicylinder engines of the type having cylinders, pistons associated therewith, a crank shaft and connecting rods associating said pistons and crank shaft, said device comprising a control rod extending longitudinally inside the engine in underlying relation to the cylinders therein, means for rotatedly supporting said control in said position, cam levers carried by said rod and lying just out of contact, respectively, with parts of the several connecting rod and piston assemblies of said engine when said parts are at their points of closest normal approach thereto, said levers being movable by abnormal travel of said parts, resulting from wear or other failure, to rotate said longitudinal rod, and a safety element responsive to rotation of said rod.

6. A safety device according to claim 5 and applicable to engines in which the pistons have skirts and the cylinders have skirts that extend below the lowest normal positions of the piston skirts, particularly characterized in that the cam levers rest against the lower ends of the cylinder skirts and are maintained in position thereagainst by spring tension acting through said rod.

7. A safety device according to claim 6 particularly characterized in that said cam levers have adjusting elements bearing against the lower ends of said cylinder skirts and are adjustably clamped to said rod.

LUIS ALFREDO BOE.

REFERENCES CITED

The following references are of record in the file of this patent:

UNITED STATES PATENTS

| Number | Name | Date |
|---|---|---|
| 1,675,780 | Alric | July 3, 1928 |
| 1,788,941 | Bradley et al. | Jan. 13, 1931 |
| 2,435,343 | Downey | Feb. 3, 1948 |

FOREIGN PATENTS

| Number | Country | Date |
|---|---|---|
| 611,832 | France | July 19, 1926 |